Dec. 16, 1969    E. F. KLIMA ET AL    3,483,649
ELECTRICAL TRAWL NET SYSTEM
Filed Oct. 29, 1968    3 Sheets-Sheet 1

INVENTORS
EDWARD F. KLIMA
WILBER R. SEIDEL
WILLIAM DeGROVE
FRANK J. HIGHTOWER

BY Ernest S. Cohen
Gersten Sadowsky
ATTORNEYS

INVENTORS
EDWARD F. KLIMA
WILBER R. SEIDEL
WILLIAM DeGROVE
FRANK J. HIGHTOWER

BY
ATTORNEYS

United States Patent Office 3,483,649
Patented Dec. 16, 1969

3,483,649
ELECTRICAL TRAWL NET SYSTEM
Edward F. Klima, Moss Point, and Wilber R. Seidel, Pascagoula, Miss., and William DeGrove, Jacksonville, Fla., and Frank J. Hightower, Biloxi, Miss., assignors to the United States of America as represented by the Secretary of the Interior
Filed Oct. 29, 1968, Ser. No. 771,582
Int. Cl. A01k 73/02
U.S. Cl. 43—9
4 Claims

ABSTRACT OF THE DISCLOSURE

An electrical system adapting a trawl net to function with an array of conducting wire electrodes which are attached to the footrope of the trawl net to place the electrodes ahead of, and transverse to the front opening of the net. The electrode array is activated by an electronic pulse generator whereby the array produces electric fields within the underwater bottom. A pulse forming circuit of the pulse generator operatively responds to a silicon controlled rectifier constituting an on-off switch which is alternately responsive to trigger and inductance-capacitance circuits of the pulse generator for timing a pulsing output therefrom to the electrode array.

---

The invention disclosed herein resulted from work done by the Bureau of Commercial Fisheries of the U.S. Department of the Interior, and domestic title to the invention is in the Government.

This invention relates to improvements in an electrical trawl net system. Electrical devices affixed contiguous to the front opening of a trawl net in the system are adapted by their connection, when the net is dragged along the sea bottom, to be carried close to such bottom where the devices create electrical fields characterized by voltage gradients which extend into and around the bottom. As a result of this action an extraneous stimulus is made to permeate this bottom under a predetermined area in front of the net causing dislocation of susceptive marine animals, including crustaceans and mollusks, such that they arise within the path of the net opening and are caught. The improved system is notably effective in facilitating a round-the-clock harvesting of shrimp which heretofore were generally sought only at night, when the shrimp leave their burrows in the sea bottom to forage, inasmuch as the present system is operable to dislodge shrimp during daylight hours when the shrimp burrowed in the sea bottom are not available to conventional gear.

An electrical trawl net also enabling daylight harvesting of shrimp is described in Patent No. 3,312,011 granted Apr. 4, 1967, to Wathne et al. This patented aquatic gear utilizes electrodes connected between a footrope of a trawl net and a forwardly placed cable section so as to be disposed substantially parallel to the longitudinal axis of the trawl net. Pulses of 60 to 80 volts D-C and 100 to 300 microseconds are supplied to the electrodes at a rate of 2 to 4 pulses a second for producing a field strength of approximately 0.4 volts across a distance of 2 inches in the electrical fields pervading the areas between the electrodes. The present invention is distinguished by an array of electrodes substantially uniformly spaced apart in front of a footrope so as to extend transverse to the trawl net opening following the generally parabolic contour of the footrope. Since voltage drop measurements taken across a specified distance between two electrodes varies with the highest voltages indicated close to the electrodes and the lowest voltages at the midpoint between them, burrowed shrimp situated in electrical fields such as produced by the longitudinal array of the patented gear as it moves ahead, are affected only by the various constant field strengths between the electrodes. Thus, shrimp close to electrodes are subjected to the greatest field voltages whereas other shrimp midway between electrodes are subjected only to lesser voltages of the electrical fields. On the other hand, as the transverse electrode array of the present invention moves ahead it provides electrical stimulation produced by the full range of field strengths wherein each shrimp is exposed to a maximum application of voltage stimulation.

Behavorial studies of shrimp subjected to electrical fields have demonstrated that the time taken to stimulate shrimp to react, and the height above the bottom reached by a stimulated shrimp during a specific time period were both dependent on the strength and repetition rate of the electrical pulses supplied to the electrodes. It is evident that in turn this reaction time and height span are determinative of the pace at which the trawl net must be moved across the sea bottom for best results. The stimulation requirements found to produce the optimum response in shrimp, and which consequently should insure the highest catch rate with an electrical trawl, are a minimum field strength of 3 volts measured across approximately 4 inches in sea water, and a pulse repetition rate of 4 to 5 per second. Under these conditions it was determined that since shrimp reach a position of approximately 3 inches above the bottom in the average time of 2 seconds, a trawl net having an electric field width of 8 feet in front of it, should be impelled at a dragging speed of 4 feet per second. Accordingly, the present invention is further characterized by a uniquely simplified pulse generator which in cooperative association with the transverse electrode array of this system gives rise to electric field conditions within the environment of the sea bottom producing the aforesaid optimum response. Capacitor discharge pulse circuitry operating in this generator under control of semiconductor devices is especially adapted to supply an output in the very low resistance circuits completed through the arrayed electrodes and sea water, having current at voltages suitable for producing the requisite electric fields.

Material relating to the background of the invention, including a partial description thereof, is given in an Experience Paper of the Food and Agriculture Organization of the United Nations, designated FR:BCSP/67/E/23, and dated June 24, 1967.

An object of the present invention is therefore to provide an electrical trawl net system including a pulse generator creating predetermined electric fields among electrodes which are spacially arranged by connections to a trawl net so as to extend transversely across the width of the net.

The invention will be further explained with reference to the embodiment of the invention illustrated by way of example in the accompanying drawings, wherein.

Figure 1:
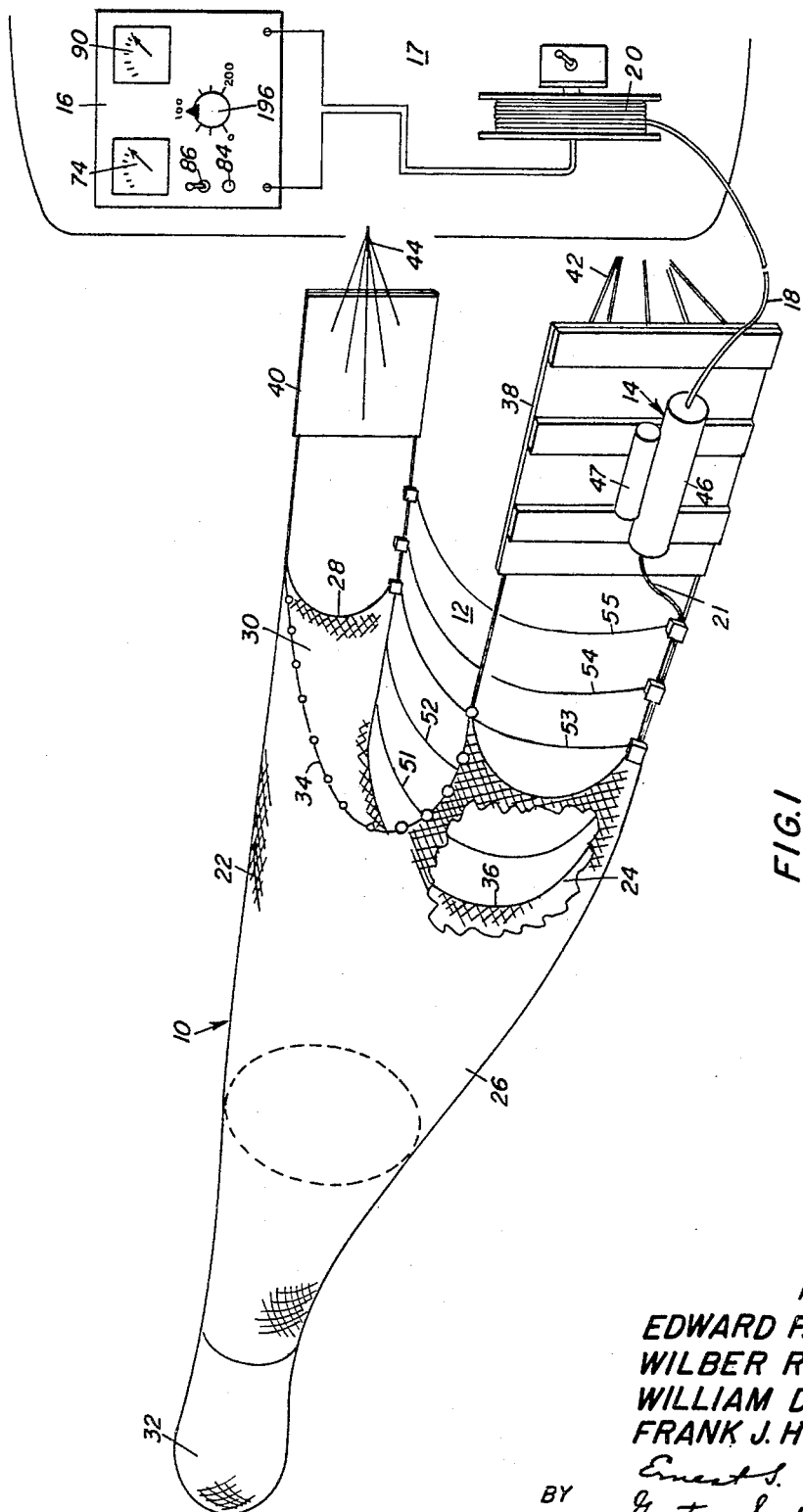
FIG. 1 is a perspective view of a trawl net according to the present invention including a showing in partly diagrammatic form of the electrical equipment operatively associated therein.

A representative embodiment of the invention is illustrated in FIG. 1 as comprising in operative association with a trawl net 10, an electrode array 12, a pulse generator assemblage 14, a power control panel 16 located aboard a trawler vessel 17, and electrical conduits including a cable 18, extending from a winch mechanism 20 aboard vessel 17, and a cable 21 for connecting generator assemblage 14 to power panel 16, and electrode array 12, respectively. Trawl net 10 may be of a conventional design wherein wedge shaped top and bottom panels 22 and 24 are held together by contoured wing panels 26 and 28 which extend rearwardly from a front opening 30 of the trawl to form a generally cylindrical bag 32 constituting the cod-end of the trawl. A headrope 34, dotted with floats, and a footrope 36 stretching along the upper and lower edges of opening 30, respectively, have end portions which extend forwardly and laterally from the opening 30, to connections therefor on separate panel structures or otter boards 38 and 40, in a manner well known in the art. Braces (not shown) supported in board 38 facilitate attachment to the board of cylindrical containers 46 and 47 which constitute water-tight cases housing electrical components of pulse generator assemblage 14.

Footrope 36 provides a support structure for electrode array 12 which fashions the array as a grid-like panel of arcuate cables 51, 52, 53, 54, and 55, wherein the cables are spaced substantially uniformly apart across an area at the threshold of net opening 30. Noninsulated, flexible conducting cable material used in making the electrodes must be capable of withstanding constant chafing of the sea bottom. Insulated stainless steel wire may be used in combination with strands of noninsulated copper wire to attain suitable strength for such cable. The ends of each electrode cable are tied to the extensions of footrope 36, and a lead wire from each electrode is strung along one of the extensions by attachments thereto. The lead wires are extended to reach board 38 where they constitute cable 21 by which the leads are brought into housing 46 and connections with the circuits of pulse generator 14 assembled therein, in a manner to be hereinafter more fully explained.

Figure 2:
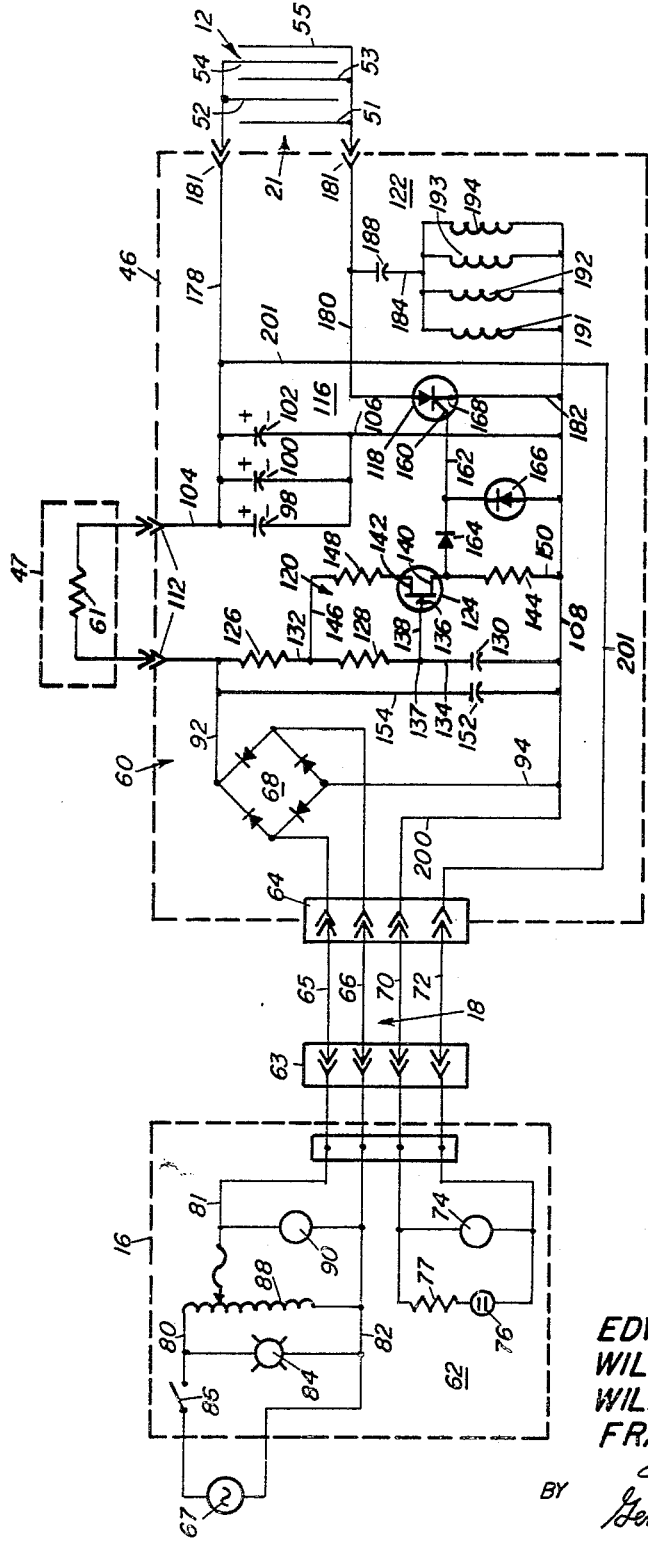
FIG. 2 is a schematic circuit diagram showing the component parts and connections of the electrical equipment represented in FIG. 1.

The electrical components of pulse generator 14 contained in housing 46, are designated in FIG. 2 as circuitry 60. Shown in FIG. 2 as associated in cooperative relationship with circuitry 60 are a charging resistor 61 of the pulse generator enclosed in housing 47, power control circuitry 62 arranged on panel 16, and electrode array 12. Cable 18 appears in FIG. 2 as having four leads which join power panel 16 and pulse generator 14 through pin socket couplings in junction plates 63 and 64, affixed to the power panel and pulse generator, respectively. Leads 65 and 66 of the cable complete a circuit delivering power from an alternating current source 67 on board vessel 17, to a full wave rectifier bridge 68 in circuitry 60, and further cable leads 70 and 72 are in a circuit completed through the generator's output circuit and parallel connections on panel 16 joining a voltmeter 74 and a neon lamp 76 having a resistor 77 in series therewith. Power derived from source 67 is transmitted through control circuitry on panel 16 arranged between leads 80, 81, and 82, extending from the source terminals to connections with cable leads 65 and 66, respectively. Parallel circuits thus completed contain a power-on indicator 84 in series with an on-off switch 86 carried in line 80, and a full scale variable transformer 88 monitored by a voltmeter 90.

Direct current output from bridge 68 is supplied on leads 92 and 94 to a pulse forming circuit wherein pulse forming current is stored in a parallel network of capacitors 98, 100, and 102. The capacitor network functions in a pulse deriving circuit completed through leads 92, 104, 106, 108 and 94, serially connecting it with charging resistor 61. Leads 92 and 104 extend through pinsocket coupling 112 facilitating electrical connections between housings 46 and 47. Pulsed current output energizing electrode array 12 is derived in circuitry 60 by an oscillator action of a circuit 116 thereof which is enabled when switching elements therein include a p-n-p-n silicon controlled rectifier (SCR) 118 cyclically responds to outputs from a trigger circuit 120, and an inductance-capacitance (L-C) network 122, alternately functioning to condition the SCR on and off, respectively.

The control exercised by trigger circuit 120 follows the cyclic operation therein of a unijunction transistor (UJT) 124. Direct current voltage output from bridge 68 on leads 92 and 94 is applied to circuit 120 by way of resistors 126 and 128, and a capacitor 130 serially connected in a circuit path completed through leads 132, 134, and 108. The emitter 136 of UJT 124 is joined to a junction 137 of this circuit path by way of a lead 138 connected between capacitor 130 and resistor 128. Circuit paths to first and second base electrodes 140 and 142 of UJT 124 are completed through a resistor 144 and a lead 150, and a resistor 148 in a lead 146, respectively. At the beginning of any operating cycle of UJT 124, it is non-conducting since its emitter 136 is reversed biased. As capacitor 130 charges through resistor 128, the voltage at emitter 136 rises exponentially toward a voltage maintained below a possible maximum voltage set by the voltage limiting action of resistor 126. When the emitter voltage reaches the predetermined peak point voltage of UJT 124, emitter 136 is forward biased and the emitter to base electrode 140 resistance drops to a low value whereby UJT 124 conducts as capacitor 130 discharges through the emitter. When the emitter voltage reaches a minimum voltage at discharge of capacitor 130, UJT 124 is turned off and the aforesaid operational sequence thereof is repeated. The period of this cyclic oscillation characterizing the operation of UJT 124 is effectively determined by the rated values of resistance 128 and capacitor 130, and independent of the supply voltage as long as a minimum supply voltage is maintained. A description in further detail of a transistor relaxation oscillator of this type is contained in the disclosure of Patent 3,210,686, granted Oct. 5, 1965, to C. J. Rocca. An additional capacitor 152 connected across the output terminals of full-wave rectifier bridge 68 by way of output leads 92 and 94, and leads 154 and 108, functions to smooth or refine the direct current supplied from the bridge.

Conduction of UJT 124 gives rise to a pulse from the transistor's base electrode 140 and on lead 162 which is connected to a base electrode 160 constituting the gate of SCR 118. A pair of diodes 164 and 166 are arranged in the trigger circuit output connections to SCR 118 to protect this component from excessive forward and reverse gate voltages, namely the voltages arising at gate 160. SCR 118 is forward biased upon receipt of the trigger circuit pulse at its gate 160 whereby the SCR is caused to conduct through a base electrode 168 thereof. Consequently, the previously described pulse forming circuit is activated, and upon discharge of capacitors 98, 100 and 102, electrode array 12 is energized. The accumulated charge is applied to electrodes 51, 52, 53, 54, and 55 in a circuit completed through leads 178, 180, SCR 118, and leads 182, 108 and 106. Conduction in SCR 118 completes a further circuit including leads 182, 108, 184 and 180, wherein a capacitor 188 of L-C network 122 is adapted to discharge and augment the voltage in the electrodes energization circuit completed through the SCR. A pin-socket coupling 181 is also used to make the connection from output leads 178 and 180 to the leads in cable 21 extending from the electrode array.

Figure 3:
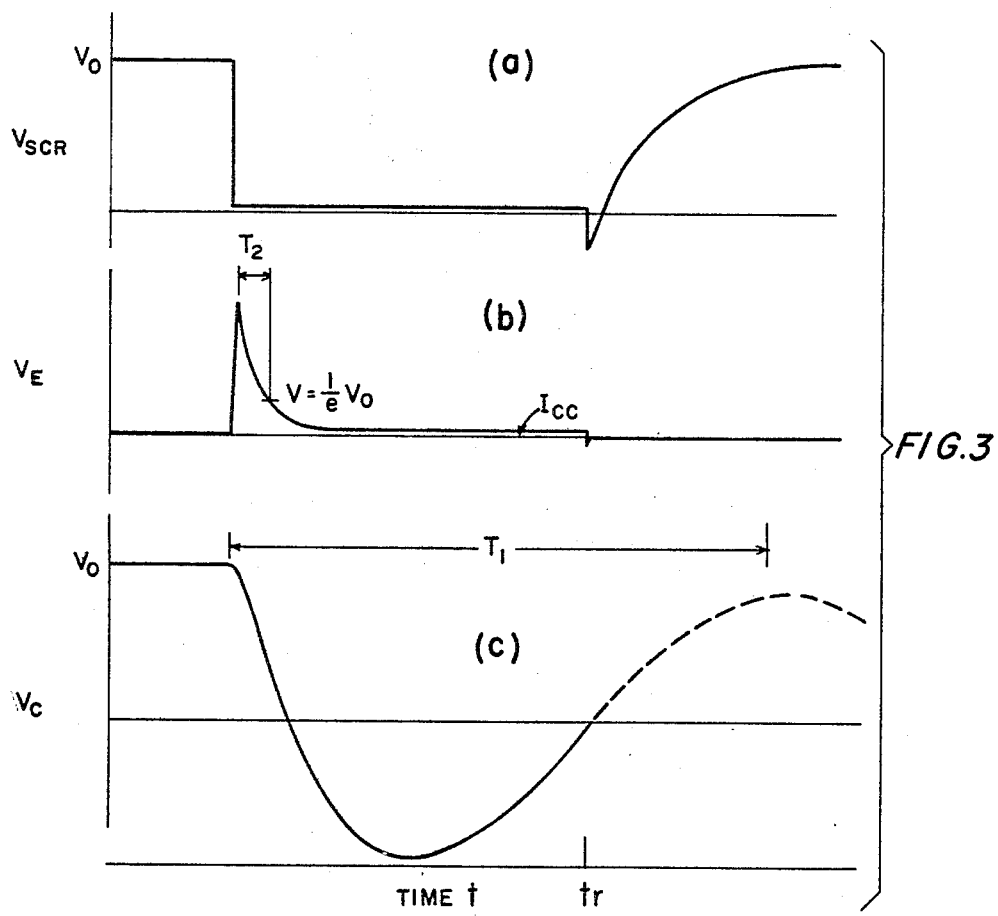
FIGS. 3a, b, and c illustrate by the waveforms shown, exemplary voltage conditions characterizing the operations of the FIG. 2 circuits wherefrom are produced the electric fields which function ahead of the trawl net.

Reference to the curves of FIG. 3 makes evident voltage conditions at various points in the circuitry of FIG. 2 with respect to a common time base $t$. Represented in part (a) of the figure by $V_{SCR}$ is the voltage across SCR 118, and indicated by $V_0$ is the D.C. operating voltage as read on control panel voltmeter 74. In part (b) the voltage $V_E$ is that measurable between electrode pairs of array 12, and in part (c) the voltage $V_C$ corresponds to that across capacitor 188. An energizing discharge to the electrodes of array 12 occurs during a half cycle in the operation of oscillator circuit 116. The L-C network inductors 191, 192, 193 and 194 function to swing the resultant voltage of the energizing circuit in a reverse direction back through the SCR electrode 168. As a consequence the energizing circuit carries a reverse current flow greater than the current available therein flowing in the forward direction, constituting the closed-circuit current indicated in FIG. 3(b) by Icc corresponding to a voltage $V_E$ whereupon SCR 118 is cut-off at a time $tr$. The L-C network provides an advantageous oscillator control in this instance since it operates effectively with a low resistance output load characterizing the electrode array in sea water. Moreover, this type of oscillator arrangement ordinarily operates on less than 10 percent of the power from the main capacitors and therefore would not significantly reduce the output pulse.

A criterion to be satisfied in designing oscillator 116 is that the resonant frequency thereof must not increase to a point where its first half-cycle could back bias current from the main capacitors 98, 100 and 102. Moreover, commutation should be possible after the discharge current has dropped practically to the closed circuit current Icc. To insure that this is the case, the time period of L-C network 122, indicated in FIG. 3(c) by $T_1$, should be at least 20 times the main, or effective output pulse period, indicated in FIG. 3(b) by $T_2$. The main pulse period $T_2$ is determined from the product of the resistance R of electrode array 12 in sea water, and the circuit capacitance. In an exemplary embodiment of the invention where array 12 in sea water has a resistance of 0.1 ohm, a 3300 microfarad capacitance, which was selected to develop an appropriate discharge current in the energizing circuit, obtained a main pulse period $T_2$ of (0.1) (3300), or 330 microseconds. Satisfying the previously mentioned requirement for a 20 to 1 ratio between time periods $T_1$ and $T_2$, L-C network 122 time period $T_1$ is equal to 6600 microseconds. Since frequency $f$ is equal to $1/T$ and the resonant frequency $f_1$ of the L-C network with negligible resistance follows the relationship $$f_1 = \frac{1}{2\pi\sqrt{LC}}$$

a proper capacitance for capacitor 188 of the L-C network is found by solving the equation for C using a suitable value of L. Inductors connected in parallel are used in network 122 in order to obtain a resistance low enough for the circuit to operate properly.

The five conductors constituting electrode array 12 are arranged to provide electric fields of substantially equal strength between electrodes of opposite polarities. In this connection electrodes 51, 53, and 55 are maintained negative whereas electrodes 52 and 54 are positive with respect thereto.

Charging resistor 61 is separately enclosed in housing 47 to secure a proper cooling for this component. Generator housing 46 is filled with oil to facilitate uniform removal of heat therefrom. The amount of oil used is measured to provide extra weight to the otherwise buoyant housing 46 which makes the pulse generator unit weightless in water.

Power control panel 16 supports a manually operable control knob 196 with which variable transformer 88 can be adjusted with reference to voltmeter 90 to determine the A.C. voltage fed to the generator circuitry 60. Leads 200 and 201 connect output leads 70 and 72 of voltmeter 74 to system output leads 178 and 180. Panel 16 thus also serves as a system monitor by presenting indications of input and output voltages of the system on voltmeters 90 and 74 respectively.

While a preferred form of the physical embodiment of the invention has been illustrated and described herein, it is understood that the invention is not limited thereby, but is susceptible to change in form and detail.

What is claimed is:

1. An electrical trawl system wherein a trawl net, adapted to operate upon underwater surfaces, includes a rearwardly extending bag converging with a funnel-like passage enlarging toward an opening at its front end, and a headrope and footrope spanning across the top and bottom edges of said front opening, respectively, said ropes extending outwardly from said front opening as two pairs of rope extensions, the ends of each said pair of extensions being separately connected to a different one of two otter boards operatively associated with said trawl net, the improvement comprising an electrode array situated adjacent to said front opening in an area located within the bounds of said footrope, said array including a plurality of uninsulated wires stretching spaced apart and transverse to said front opening and substantially parallel thereto, said wires each having the respective ends thereof attached to a different one of said footrope extensions, means enclosing a pulse generator, and further means affixing said means on one of said boards, a remote source of alternating current power, separate cable means electrically associating said pulse generator with said arrayed electrodes and said remote power source, said pulse generator comprising a rectifier connected across said remote power source and establishing an output of direct current, a pulse forming network connected across said rectifier output, an output circuit connected between said network and said electrode array, a further circuit including a switching means in said output circuit, a trigger circuit connected across said rectifier output and operable to supply pulses to an output lead thereof connected to said switching means, said trigger pulses turning on said switching means whereby said output circuit is completed and said network functions in said output circuit to supply pulses to said electrode array, and an inductance-capacitance circuit connected across said switching means and serially in said output circuit, said inductance-capacitance circuit being operable during the operation of said network to turn off said switching means.

2. The electrical trawl system of claim 1 wherein said plurality of uninsulated wires of said electrode array are separately connected in an alternating sequence to negative and positive terminals of said output circuit whereby the first, third, and last of said electrodes are connected to negative.

3. The electrical trawl system of claim 1 wherein said pulse forming network comprises a plurality of capacitors connected in parallel and serially with a charging resistor.

4. The electrical trawl system of claim 1 wherein said switching means is a silicon controlled rectifier having a base electrode in circuit with said trigger circuit output lead, and a further base electrode connected to said output and inductance-capacitance circuits.

References Cited

UNITED STATES PATENTS

| | | | |
|---|---|---|---|
| 2,903,813 | 9/1959 | Gudjohnseh et al. | 43—9 |
| 3,043,041 | 7/1962 | Kreutzer | 43—17.1 |
| 3,110,978 | 11/1963 | Kreutzer | 43—4.5 |
| 3,415,001 | 12/1968 | Ott et al. | 43—17.1 |

WARNER H. CAMP, Primary Examiner

U.S. Cl. X.R.

43—17.1